Sept. 11, 1945.  R. BARRIES  2,384,591
TRAILER
Filed Oct. 6, 1944  4 Sheets-Sheet 1

Inventor
Richard Barries
By Clarence A. O'Brien
and Harvey B. Jacobson
Attorneys Sept. 11, 1945.    R. BARRIES    2,384,591
TRAILER
Filed Oct. 6, 1944    4 Sheets-Sheet 3

Inventor
Richard Barries
By Clarence A. O'Brien
and Harvey B. Jacobson
Attorneys Sept. 11, 1945.   R. BARRIES   2,384,591
TRAILER
Filed Oct. 6, 1944   4 Sheets-Sheet 4
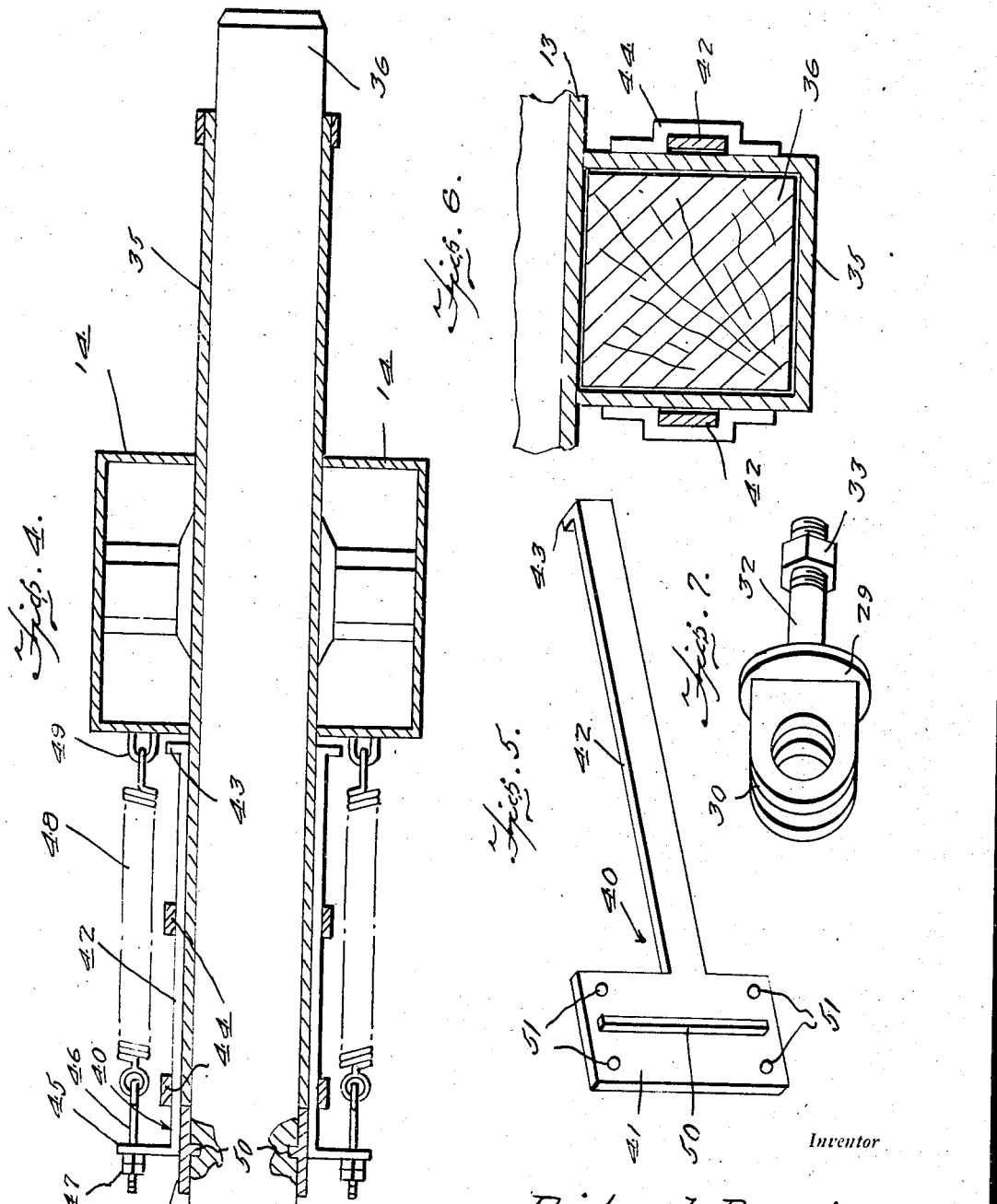
Inventor
Richard Barries
By Clarence A. O'Brien
and Harvey B. Jacobson
Attorneys Patented Sept. 11, 1945

2,384,591

UNITED STATES PATENT OFFICE 2,384,591

TRAILER

Richard Barries, Susanville, Calif.

Application October 6, 1944, Serial No. 557,425

5 Claims. (Cl. 280—33.9)

This invention relates to trailers, and more particularly to a heavy duty trailer adapted for use in such operations as hauling logs or the like.

A primary object of this invention is the provision of an improved heavy duty trailer characterized by a novel means for securing the towing pole thereto.

A further object is the provision of such a trailer having means whereby shock imparted to the wheels thereof as by inequalities in the road, is not transmitted as strain to the towing pole.

Still another object is the provision of means in association with such a trailer whereby strain on the pole as by sudden stopping and starting of the towing vehicle is compensated for in such manner as to reduce to a minimum the possibility of breaking the pole thereby.

Still another object is the provision of means for securing a towing pole to such a trailer, obviating the passage of bolts or other securing means through the towing pole.

A still further object is the provision of such a trailer, and means for securing a towing pole thereto, which will be sturdy and durable in construction, reliable and efficient in operation, and relatively simple and economical to manufacture.

Still further objects reside in the combinations of elements, features of construction, and arrangements of parts, all as will be more fully pointed out hereinafter and shown in the accompanying drawings, wherein there is disclosed a preferred embodiment of this inventive concept.

In the drawings:

Figure 4 is a sectional view taken substantially along the line 4—4 of Figure 1 as viewed in the direction indicated by the arrows.

Figure 5 is an enlarged perspective view of certain details of construction.

Figure 6 is an enlarged sectional view taken substantially along the line 6—6 of Figure 3, and Figure 7 is an enlarged perspective view of a certain constructional detail.

Like reference numbers refer to like parts throughout the several views of the drawings.

Figure 1:
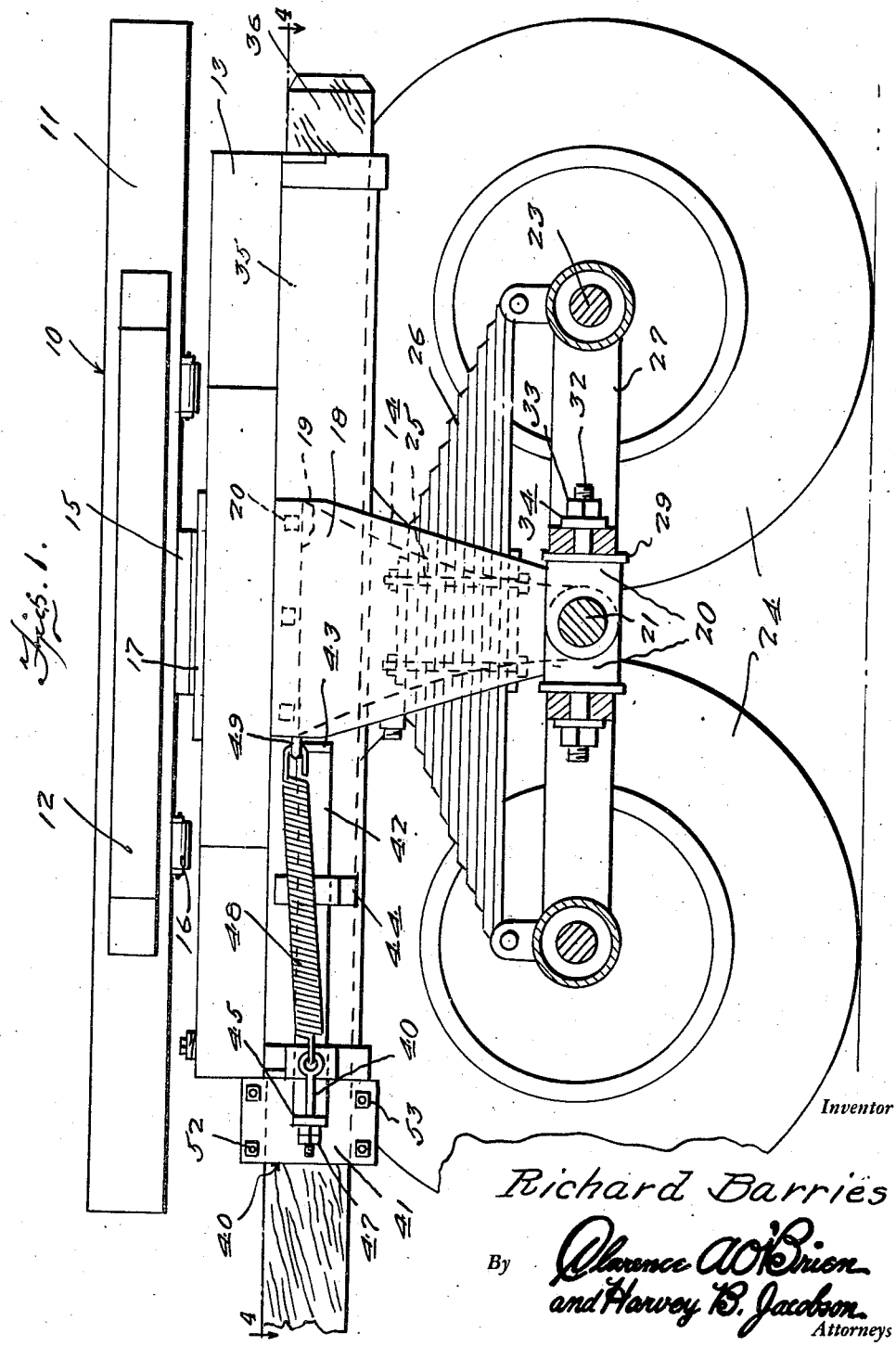
Figure 1 is a side view partially in elevation and partially in section of one form of heavy duty trailer embodying this inventive concept.
Figure 2:
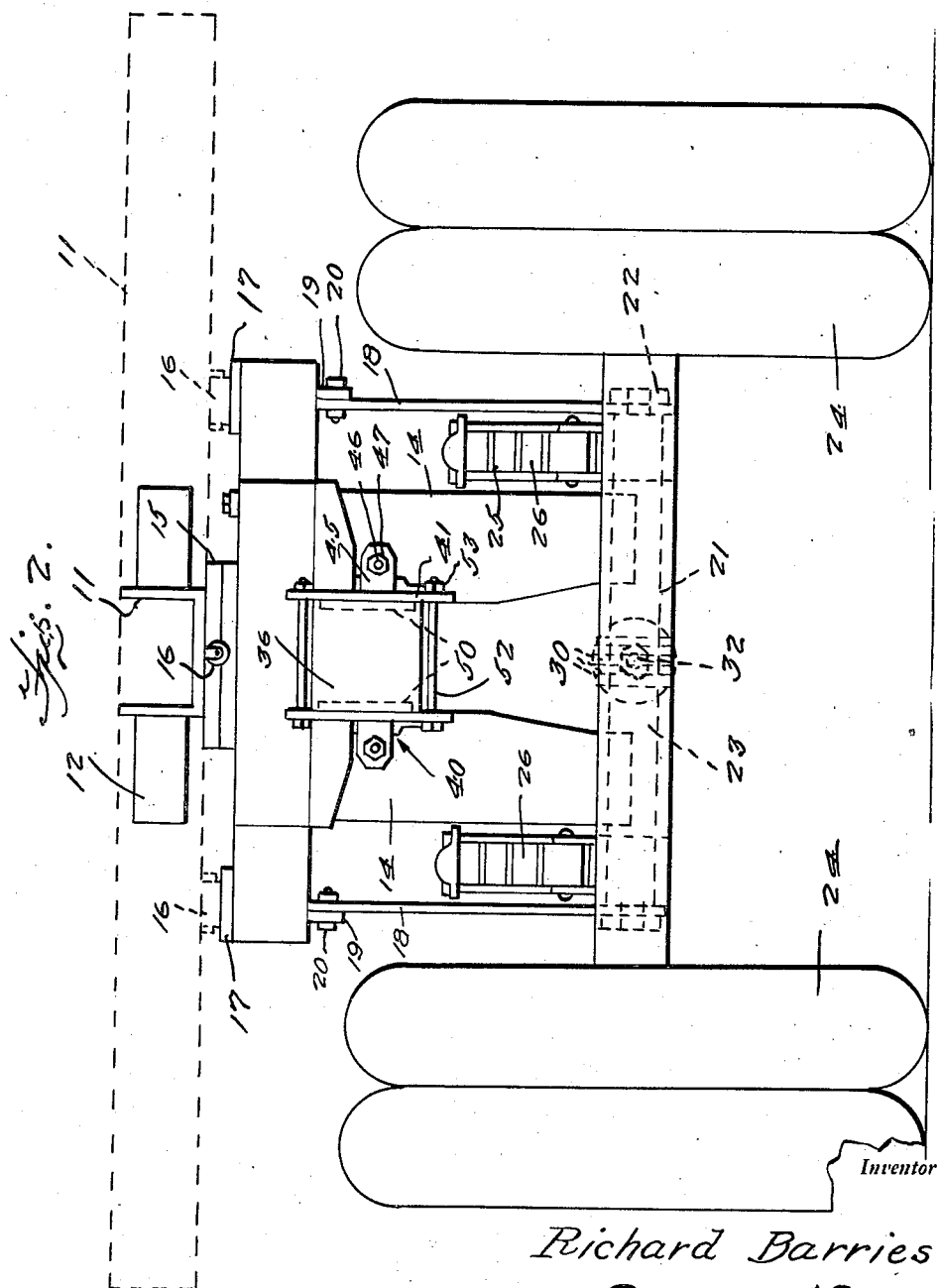
Figure 2 is a front elevational view of the device in Figure 1, certain parts thereof being indicated in section, certain other parts being indicated in dotted lines.

Having reference now to the accompanying drawings, there is generally indicated at 10 a supporting bunk or frame comprised of a beam bunk 11 and a false bunk 12, underlying which are water tanks 13 and air tanks 14 to provide pressure for the hydraulic brakes of the trailer, and the like. Secured to the underside of the bunk 10 are a turntable member 15 and oppositely aligned tapered rollers 16 adapted to ride on trucks 17, secured to the upper surface of water tanks 13 to facilitate turning of the bunk. Braces or support members 18 extend downwardly from flanges 19 on the bottom of tanks 13, being secured thereto by bolts 20, and support a centrally disposed equalizer shaft 21, the ends of shaft 19 being journaled in and secured to the supports 18, by collars 22.

A pair of additional axles 23 carrying a plurality of heavy duty wheels 24 at their extremities are mounted on opposite sides of shaft 21 and suitably secured as by bolts 25 to opposite ends of a pair of heavy duty leaf springs 26.

Figure 3:
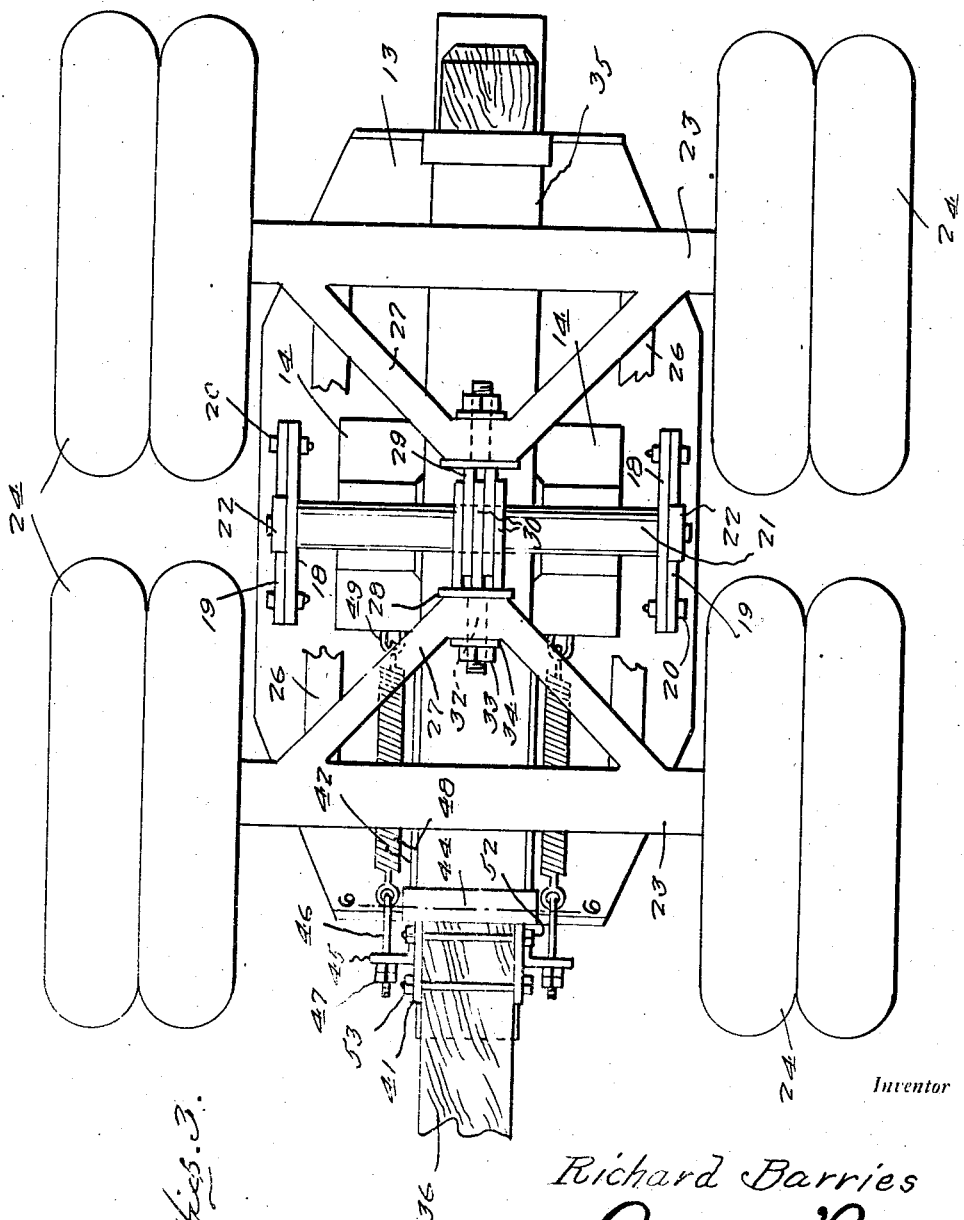
Figure 3 is a bottom plan view of the device shown in Figures 1 and 2.

As best shown in Figure 3, V-shaped members 27 project from each of axles 23 inwardly toward shaft 21, having the extremities of their legs fixedly secured to the axle and having secured to the apex of each a member 28 and 29, each comprised of a plurality of flat fingers 30 provided with centrally disposed apertures 31 and adapted to surround shaft 21.

In the illustrative embodiment shown member 28 is provided with three fingers and member 29 with two, although the particular number is immaterial, and the arrangement is such that the fingers are adapted to interlock, the shaft 21 being passed alternately through an aperture in fingers of opposite members.

The ends of members 28 and 29 are each provided with a shank 32 threaded at its extremity and adapted to pass through a suitable longitudinally extending aperture in the apex of number 27, being secured therein as by nuts 33 and washers 34.

From the foregoing it will now be seen that any shock imparted to any one of the wheels 24, and, in turn, transmitted to its associated axle 23, is largely taken up by the springs 26, and relatively minimized in its effect on the beam bunks 10 due to the pivotal relation of each of axles 19 with equalizer shaft 21, due to the connection above described.

Secured to the underside of frame 10 and extending between legs 14 is a metal channel or frame 35 extending substantially the full length of the trailer body, and comprising a pole tunnel, being of a size and configuration to accommodate a towing pole 36. Towing pole 36 fits snugly within tunnel 35 and extends substantially the full length thereof.

Improved means are provided for securing the pole 36 in the tunnel 35, such means taking the form of two oppositely disposed members generally indicated at 40, each comprised with a plate 41 having an extending tongue 42 secured thereto in any desired manner as by welding or the like and provided at its extremity with an outwardly turned leg 43. Tongues 42 are adapted to be secured to the sides of channel 35 as by brackets 44, the projecting lug 43 precluding the complete withdrawal of the members from their associated brackets. The opposite ends of members 42 are correspondingly supplied with outwardly extending lugs 45, adjacent the point at which they are secured to plates 41. Lugs 45 are each provided with an aperture through which extends an eye bolt 46, which are held in position as by nuts 47. Secured to eye bolts 46 are relatively heavy tension springs 48, the opposite ends of which are secured in suitable lugs 49 secured to air tanks 14.

The interior of each of plates 41 is provided with a projection or flange 50 adapted to bite in the trailer pole 36. Plates 41 are of a length in excess of the height of tow pole 36 and are provided at spaced points adjacent their upper and lower extremities with apertures 51, through which are adapted to be passed bolts 52 connecting the opposite plate 41 and being secured in related assembly as by nuts 53.

From the foregoing it will be seen that the projecting flanges 50 of plates 41 engaging in tow pole 36 provides the sole fixed connection between the trailer and the pole, and it will further be seen that the relatively tight engagement of the plates with the pole occasioned by tightening nuts 53 on bolts 52 will securely hold the same within tunnel 35.

It will also be seen that the members 46 are, except for their engagement with brackets 44, unsecured to the frame, except by springs 48. It will thus appear that any strain or pull exerted on the tow pole 36 is resiliently absorbed by springs 48, it being pointed out that the springs are of a sufficient strength normally to hold the tow pole 36 within the tunnel 35 and effect a secure connection with the towing vehicle, but are sufficiently resilient so that upon a severe shock or jerk imparted to the tow pole, the same will be transmitted to the trailer through the springs 48 in such manner as to cushion the effect of the same.

From the foregoing it will now be seen that there is herein provided a heavy duty trailer, accomplishing all the objects of this invention and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting manner.

I claim:

1. In a device of the character described, in combination, a wheeled frame, means forming a channel carried by said frame, a tow pole slidably mounted in said channel, plates disposed on opposite sides of said pole, lugs on the inner sides of said plates adapted to engage in said pole, bolts securing said plates tightly against said pole, tongues extending from said plates along the sides of said channel, brackets securing said members to said channel, tension springs secured between said plates and said frame.

2. In a device of the character described, in combination, a wheeled frame, means forming a channel carried by said frame, a tow pole slidably mounted in said channel, plates disposed on opposite sides of said pole, lugs on the inner sides of said plates adapted to engage in said tow pole, bolts securing said plates tightly against said pole, tongues extending from said plates along the sides of said channel, brackets securing said members to said channel, lugs at the ends of said members precluding disengagement of said members with said brackets, and tension springs secured between said plates and said frame.

3. In a device of the character described, in combination, a wheeled frame, means forming a channel carried by said frame, a tow pole slidably mounted in said channel, plates of a length greater than the height of said pole, and having apertures adjacent their upper and lower edges, bolts passed over and under said pole through said apertures securing said plates tightly against said pole, and tension springs secured between said plates and said frame.

4. In a device of the character described, in combination, a wheeled frame, means forming a channel carried by said frame, a tow pole slidably mounted in said channel, plates of a length greater than the height of said pole, and having apertures adjacent their upper and lower edges, lugs on the inner sides of said plates adapted to engage said pole, bolts passed over and under said pole through said apertures securing said plates tightly against said pole, and resilient means secured between said plates and said frame.

5. In a device of the character described, in combination, a wheeled frame, means forming a channel carried by said frame, a tow pole slidably mounted in said channel, plates of a length greater than the height of said pole, and having apertures adjacent their upper and lower edges, lugs on the inner sides of said plates adapted to engage in said pole, tongues extending from said plates along the sides of said channel, brackets securing said members to said channel, means precluding the disengagement of said members with said channel, bolts passed over and under said pole through said apertures securing said plates and said lugs in tight engagement with said pole, and springs extending between said plates and said frame.

RICHARD BARRIES.